Patented Dec. 25, 1951

2,579,985

UNITED STATES PATENT OFFICE 2,579,985

MOLDED TABLEWARE ARTICLES AND RESINS USED TO PRODUCE SAME

Andrew A. Varela, Old Greenwich, Conn., and Ralph J. Schupp, Port Chester, N. Y., assignors to American Cyanamid Company, New York, N. Y., a corporation of Maine No Drawing. Application January 17, 1951, Serial No. 206,502

4 Claims. (Cl. 260—67.6)

This invention relates to novel, thermosetting resinous compositions and, more particularly, to coreacted, benzoguanamine-melamine-formaldehyde resins which are particularly adapted for molding tableware articles which have very substantially improved coffee stain resistance. Still further, this invention relates to the molded tableware articles themselves which are produced by molding benzoguanamine-melamine-formaldehyde resins containing a filler.

One of the objects of the present invention is to produce a resinous composition which will be particularly applicable for use in the manufacture of molded tableware articles which have improved coffee stain resistance.

It is well known that aminotriazine-aldehyde resins, generally, and melamine-formaldehyde resins in particular, have certain outstanding advantages in the field of resinous molding compositions. For example, these resins are heat hardenable and in the hardened state they possess superior resistance to water, solvents softening or other failure under heat, tracking under electric stress, resistance to such surface failures as loss of gloss, crazing and discoloration under heat and light. These and other advantages permit manufacture of molded articles of superior qualities.

There are, however, certain physical properties of melamine resins in general which limit their usefulness for particular purposes. For instance, melamine-formaldehyde resins, used alone, produce molded articles which have a rather poor coffee stain resistance when the mol ratio of melamine to formaldehyde in the resin is 1:2 or higher such as 1:3. The applicants have discovered that benzoguanamine-formaldehyde resins have, when molded, excellent coffee-stain resistance. The benzoguanamine-formaldehyde resins, however, do not display the desired curing characteristics which the melamine-formaldehyde resins possess. The applicants have further discovered that when benzoguanamine and melamine are coreacted with formaldehyde, they can produce a resinous composition which, when molded, produces articles of very substantially increased coffee stain resistance wherein all of the desirable embodiments of the benzoguanamine-formaldehyde resins with respect to coffee stain resistance are retained while still retaining the desirable curing characteristics of the melamine-formaldehyde resins. This coreacted resin should have present melamine and benzoguanamine in a mol ratio within the range of 1:2 to 3.3:1, respectively, and preferably 1.6:1, respectively. It is further desired that the ratio of benzoguanamine and melamine to formaldehyde in the coreacted resin be within the range of 1:1.5 and 1:2.1, respectively, and preferably 1:1.5, respectively. In order that the concept of the instant invention be more completely understood, the following example which illustrates a process for the preparation of the coreacted resin, is set forth in which all parts are parts by weight. It should be remembered, however, that this example is set forth solely for the purpose of illustration and should not be interpreted as a limitation on the case except as indicated in the appended claims.

Example 184 parts of benzoguanamine, 192 parts of melamine and 335 parts of a 37% aqueous formaldehyde solution are introduced into a suitable reaction chamber equipped with thermometer, stirrer, and reflux condenser and mixed for approximately 5 minutes. The pH is adjusted to 6.2–6.6 (glass electrode at 25° C.) using sodium hydroxide. The reaction mixture is heated to reflux (97° C.) in 25–35 minutes. Reflux is continued until the resin hydrophobes in the kettle (90–120 minutes). The syrup thus produced is cooled to 60–65° C. in 10 to 20 minutes. There is then added 289 parts of a 60% aqueous butanol solution, thoroughly mixed with the syrup, and filtered. 100 parts of the syrup thus produced (50% solids) and 19.5 parts of BB cut pulp (alpha cellulose pulp) are thoroughly mixed at 60–65° C. for 25 minutes. The pulp resin mixture is dumped and screened for drying. The mixture is dried for 30 minutes at 175° F., dry bulb; 115° F., wet bulb; followed by drying for 15 minutes at 182° F., dry bulb; 115° F., wet bulb. 100 parts of the dried resin thus produced is ground with 0.25 part phthalic anhydride and 0.75 part zinc stearate in a ball mill for 16–18 hours. The resin pulp mixture is then ready for molding. The product obtained in this manner was then molded at 3500 p. s. i. at 150° C. for periods of time varying from 2–20 minutes. Molded articles obtained in this manner in all of the cure cycles had excellent characteristics and appearances. These molded articles were then subjected to strictly controlled stain tests as follows: the test was conducted by immersion of the molded articles in a coffee beverage which simulated tableware use conditions. In this test, 40 grams of the ground coffee is added to 700 cc. of water (4 cups) and the mixture brought to a boil and boiled for 5 minutes. To the coffee solution is added 6 teaspoons of sugar (1½ ts. per cup) and 60 cc. of cream (50/50 cream/homogenized milk). The mixture is stirred thoroughly and filtered through cheese cloth. 500 cc. of the above prepared coffee solution are placed in an 8 inch watch glass covered battery jar. Samples of the molded resin measuring 2½" x 1" are immersed half way in coffee solution and the battery jar placed in an oven at 60° C. The coffee prepared by this method and used in this test had a pH of 5.1. The coffee is changed every 24 hours and new coffee is prepared in the same manner as that set forth hereinabove. The same brand and grind of coffee is used in each preparation so as to insure uniformity in each successive test. The samples of the molded resin are washed each twenty four hours as follows: A solution of 1 quart of water and 1 tablespoon of a detergent are warmed to 55–60° C. The chips are placed in this solution for 3 minutes and rinsed in clear water at 85° C. for two minutes. The samples are laid on a clean cloth and allowed to air dry. The samples are then examined visually and microscopically for signs of staining, crazing, pitting and discoloration. The samples after each 24 hour immersion are compared with a piece of the original molding. Molded samples showed first signs of coffee staining at 1000 hours and first objectionable stains after 2000 hours; whereas, molding samples of a melamine-formaldehyde resin having a mol ratio of 1:1.5, respectively, showed first signs of staining after 600 hours, and first objectionable stain after 1500 hours. Molded samples of a melamine-formaldehyde resin having a mol ratio of 1:2, respectively, showed first signs of staining after 350 hours and first objectionable stain after 700 hours. Molded samples of a melamine-formaldehyde resin having a mol ratio of 1:3, respectively, showed first signs of staining after 150 hours and first objectionable stain after 450 hours.

In addition to the clear and filled molded articles as described hereinabove, molding compositions may be prepared by incorporating other additives with the resin, such as colorants, i. e., pigments and dyes, and the like without depreciating the other advantageous properties of the molded articles.

In the place of the BB cut pulp, one may use any of the well known fillers which are conventionally employed in the preparation of the synthetic molding resins such as walnut shell flour, wood flour, alpha pulp, synthetic cellulose fibers, i. e., rayon, etc. and the like. Additionally, one may use in the place of the zinc stearate, any of the other conventional lubricants which serve comparable purposes. Still further, as an acid curing catalyst, one may use in the place of the phthalic anhydride such acids as hydrochloric, sulfuric, acetic, benzoic, maleic, and the like. In addition to the use of the thermosetting, molding composition in the manufacture of tableware articles, such as cups, saucers, plates, etc., the composition of the present invention may be used readily in the manufacture of buttons and other molded articles and, in such use, it may be desirable to produce a clear, molded product in which event, one would eliminate the filler and could elect to use or eliminate such additives as pigments, dyes, and the like.

We claim:

1. A thermosetting, resinous composition, particularly adapted for molding tableware articles having improved coffee stain resistance, comprising a benzoguanamine-melamine-formaldehyde resin, wherein the mol ratio of benzoguanamine to melamine is within the range of 1:3.3 to 2:1, respectively, and the mol ratio of benzoguanamine and melamine to formaldehyde is 1:1.5 to 1:2.1, respectively.

2. A thermosetting, resinous composition, particularly adapted for molding tableware articles having improved coffee stain resistance comprising a benzoguanamine-melamine-formaldehyde resin, wherein the mol ratio of benzoguanamine to melamine is about 1:1.6, respectively, and the mol ratio of benzoguanamine and melamine to formaldehyde is about 1:1.5, respectively.

3. A molded tableware article having improved coffee stain resistance comprising a benzoguanamine-melamine-formaldehyde resin and a filler, wherein the mol ratio of benzoguanamine to melamine is within the range of 1:3.3 to 2:1, respectively, and the mol ratio of benzoguanamine and melamine to formaldehyde is 1:1.5 to 1:2.1, respectively.

4. A molded tableware article having improved coffee stain resistance comprising a benzoguanamine-melamine-formaldehyde resin and a filler wherein the mol ratio of benzoguanamine to melamine is about 1:1.6, respectively, and the mol ratio of benzoguanamine and melamine to formaldehyde is about 1:1.5, respectively.

ANDREW A. VARELA.
RALPH J. SCHUPP.

No references cited.